United States Patent
Zangerl

(10) Patent No.: US 7,171,173 B2
(45) Date of Patent: Jan. 30, 2007

(54) REDUNDANT GPS ANTENNA SPLITTER

(75) Inventor: Bernhard Zangerl, Landeck (AT)

(73) Assignee: Harris Communications Austria GmbH, Brederis (AT)

(*) Notice: Subject to any disclaimer, the term of this patent is extended or adjusted under 35 U.S.C. 154(b) by 381 days.

(21) Appl. No.: 10/500,045

(22) PCT Filed: Jul. 1, 2002

(86) PCT No.: PCT/EP02/07248

§ 371 (c)(1),
(2), (4) Date: Jun. 23, 2004

(87) PCT Pub. No.: WO03/056661

PCT Pub. Date: Jul. 10, 2003

(65) Prior Publication Data

US 2005/0107052 A1    May 19, 2005

(30) Foreign Application Priority Data

Dec. 27, 2001   (AT) .............................. 101 64 165

(51) Int. Cl.
*H04B 1/04* (2006.01)
*H04B 1/02* (2006.01)

(52) U.S. Cl. ...................................... 455/129; 455/318

(58) Field of Classification Search ................ 455/129, 455/318–319, 13–13.5; 342/357.06; 701/213–216
See application file for complete search history.

(56) References Cited

FOREIGN PATENT DOCUMENTS

JP          11298380          1/2000

OTHER PUBLICATIONS

"Technical Description 8 ×GPS Power Splitter 4449", Hopf Elektronik Gmbh, Mar. 21, 2001 XP002220840, available at www.hopf.com/download/manuals/english/4xxx/e4449_0100.pdf.

(Continued)

*Primary Examiner*—Thomas H. Tarcza
*Assistant Examiner*—Nga X. Nguyen
(74) *Attorney, Agent, or Firm*—Allen, Dyer, Doppelt, Milbrath & Gilchrist, P.A.

(57) ABSTRACT

With a redundant GPS antenna splitter two GPS antennas are connected through an amplifier to a passive antenna splitter in parallel feeding mode, whereby the direct current supply of the antennas is provided by a DC driver stage, whose inputs (DC1 to DC8) are coupled with outputs of the antenna splitter of the connected transmitters in order to control the power supply with current measuring stages depending on the operating condition of the GPS antennas and to deliver a supply voltage both to the GPS antenna and HF-amplifier, if the antenna is active.

31 Claims, 5 Drawing Sheets

OTHER PUBLICATIONS

Stanley C. Maki, "A Low Cost GPS Inertial Guidance (GPSIG) For Space Boosters", IEEE, USA.

J Blake Bullock "Test Results and Analysis of A low Cost Core GSP Receiver For Time Transfer Applications", IEEE, US May 28, 1997.

"Technical Description 8×GPS Power Splitter 4449", hopf Elektronik Gmbh, Mar. 21, 2001 XP002220840, available at www.hopf.com/dowmload/manuals/english/4xxx/e4449_0100.pdf.

"A Low-Cost GPS Inertial Guidance (GPSIG) for Space Boosters", IEEE Plans '90: Position Location and Navigation Symposium Record. 'The 1990's—A decade of Excellence in the Navigation Sciences (CAT. No. 90CH2811-8), Las Vegas, NV, USA, Mar. 20-23, 1990, pp. 176-183, XP010001125 1990 New York, NY, USA, IEEE, USA.

"Test Results and Analysis of a Low Cost Core GPS Receiver for Time Transfer Applications", Frequency Symposium, 1997, Proceedings of the 1997 IEEE International Orlando, FL, USA, May 28-30, 1997, New York, NY, USA, IEEE, US May 28, 1997, pp. 314-322, XP01025754, ISBN: 0-7803-3728-X.

REDUNDANT GPS ANTENNA SPLITTER

FIELD OF THE INVENTION

The invention relates to a Redundant GPS antenna splitter with at least one GPS antenna to be connected to numerous GPS outputs of transmitters through a passive antenna splitter and possibly an amplifier.

The invention is suitable for all systems, which require GPS antenna signals for time and frequency synchronization. A very special application results from the introduction of new digital coding and transmission processes (COFDM=Coded Orthogonal Frequency Division Multiplex) in the field of terrestrial broadcasting technology. Through this new digital transmission processes more frequencies become available with the same amount of data or number of programs compared to existing analog systems. These frequencies and the bandwidth can be used for the transmission of additional programs. This makes it possible to position several transmitters on the same location, which can be operated on the same frequency due to the new coding and transmission processes of COFDM. A requirement for this is a frequency and time synchronization, which can be realized with the GPS (Global Positioning System). This also implies that a GPS signal must be supplied to each transmitter.

BACKGROUND OF THE INVENTION

It is known that several transmitters can be connected to a GPS antenna through amplifiers. For this passive splitters, e.g. Wilkinson splitters with four GPS outputs are used. If the GPS antenna breaks down in such a setting, all transmitters connected to it cannot broadcast anymore. Another frequent disadvantage concerns the mounting of transmitter antennas on a transmitter pole assigned to a transmitter location, if a number of transmitters are operated with this pole and many GPS-antennas must be mounted on this pole. Lack of space on the pole quite often poses a serious impairment, which results in relatively high mounting costs.

SUMMARY OF THE INVENTION

With this invention a redundant GPS antenna splitting should be created, which overcomes these difficulties and preferably distributes the GPS signal to a number of transmitters so that the broadcasting capability of the connected transmitters is preserved in the event of a break-down of a single GPS antenna. Care should also be taken for an automatic switch to a functioning transmitter in the event of switching off a transmitter or break-down of one or more transmitters connected to the GPS antenna and for an automatic switch to another GPS antenna in the event of idle run (antenna not connected) or break-down (short-circuit) of a GPS reception antenna, whereby the circuit (logic) must not be destroyed, if both GPS antennas fail to function.

Starting from the GPS antenna splitter mentioned at the beginning, these differences are adressed by a parallel connection of a second GPS antenna to the passive antenna splitter via an amplifier so that multiple antenna splitter outputs are connected to the two GPS antennas via a DC driver stage with a supply voltage for the GPS antennas being available on the output of the DC driver stage. Further, the DC driver stage contains current measuring stages, which depending on the operating condition (regular operation, idle run or short-circuit) of the GPS antennas, switches the power supply of the HF amplifiers and the supply voltage of the GPS antennas on and off.

As a result of these measures there is the advantage that multiple transmitters connected to the outputs of the passive antenna splitter and occupied with various channels can alternatively be switched to two redundant GPS antennas, which increases the operational reliability tremendously. Another advantage is that much lower mounting efforts are necessary.

An advantageous design of the invention provides that the antenna splitter has eight outputs, to which eight GPS receivers or transmitters can be connected.

A special version of the invention is that the DC driver stage supplies the supply voltage for the two GPS antennas at any time, even if only one transmitter is in operation, whereby the equipment is automatically switched to the transmitter that delivers the highest voltage.

A particularly advantageous version of the DC driver stage contains a DC monitoring stage, which provides a decoupling stage for each antenna splitter output connected to a transmitter, in which an operational amplifier (OPA) responds to the difference between the DC supply voltage delivered by the transmitter and the output voltage of the assigned GPS antennas to make a semiconductor switch conductive, and to connect the transmitter with the highest voltage to the GPS antenna.

For this purpose each decoupling stage has an OPA, which detects the difference between the DC supply voltage supplied by the transmitter and present on an input through a switching transistor, and the voltage before the transistor and present on the second input and in the decoupling stage with the highest voltage difference turns on the transistor, whereby the DC supply voltage is present on the common output line. A defined hysteresis is provided to avoid a permanent switching back and forth between various decoupling stages with almost identical differences in voltage.

Through this measure the supply voltage always comes from a single transmitter and guarantees a full decoupling between different paths. To compensate losses as a result of attenuation due to splitter losses and cables and to keep the required power at a minimum, the HF amplifier inserted between the active GPS antenna and the passive antenna splitter is kept operating through the current measuring stage.

For realizing this measure current, measuring resistors are inserted in both DC paths between the antenna splitter and the GPS antennas, which deliver a nominal value via a current measuring path regulated by an OPA, which serves the regulation of a window comparator. The outputs of a window comparator open a semiconductor switch in the assigned DC path via a switching transistor in the event of a current value deviating from a nominal value that defines an intact antenna (under-and overcurrent). In the event of overcurrent the switch is opened without delay, while in the event of undercurrent a defined time constant delays the opening of the switch.

To preserve the switching condition of a GPS antenna after switching off, a change-over and holding stage is provided. Derived from the output signals of the window comparators the switching condition is stored with a semi-stable flip flop, and the switching transistor in the DC path of the active antenna is kept in a stable conductive state and switches off the HF amplifier of the inactive antenna. This results in a stable switching condition for switching on the antenna, and supply power is saved through switching off the non-required HF-amplifier.

To protect the switching stages following the GPS antennas effectively against lightning or highly intrusive surge voltages a filter serving as a lightning protection is inserted after the GPS antennas and before the HF amplifier.

BRIEF DESCRIPTION OF THE DRAWINGS

The advantages and features of the invention can be seen from the following description of an embodiment in connection with the patent claims and the drawings wherein:

DETAILED DESCRIPTION OF THE PREFERRED EMBODIMENTS

Figure 1:
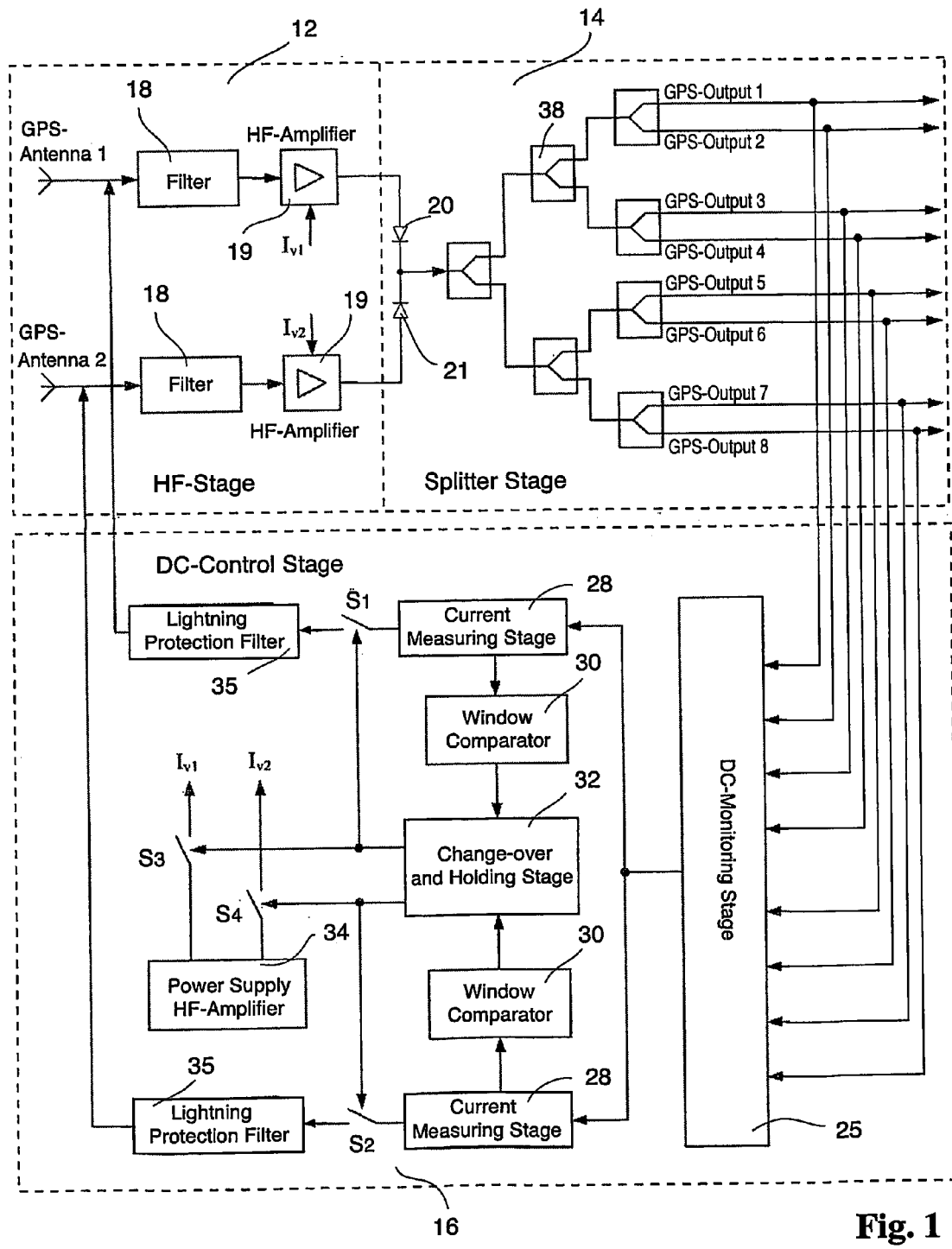
FIG. 1 is a basic block diagram of the redundant GPS antenna splitter according to the invention.

The redundant GPS antenna splitter shown in FIG. 1 includes an HF path that is parallel to a DC path. Through the HF path the GPS signal is transmitted by the outlined antennas 1 and 2 to the transmitters connected to the outputs of the antennas. In the parallel path a DC supply delivered by the transmitters through the physically identical line is supplied to the antennas through the DC path.

In the HF stage 12 the GPS signal of both antennas is supplied to an HF amplifier through a filter 18. With the filter 18 undesired intrusive signals, e.g. mobile radio standard (GSM) and, in particular, the basic frequency of the channel 60 (782 to 792 MHz) reserved at present for TV applications are suppressed, whose 1st harmonic is in the range of the GPS signal. At the same time the losses from attenuation in the splitter and the cables are compensated with the two HP amplifiers 19. The operation of these HF amplifiers is controlled by the DC driver stage.

The output signals of the HF amplifiers 19 are interconnected through the diodes 20 and 21 and supplied to the splitter stage 14, which transmits the GPS signals to the GPS outputs 1 to 8 and the connected transmitters.

The DC supply of the GPS antennas 1 and 2 is provided by the DC driver stage 16. The DC signals from the transmitters, preferably +5 or +12 V is decoupled on the GPS outputs 1 to 8 and supplied to a DC monitoring stage 25. This DC monitoring stage 25 provides for the constant availability of the DC supply voltage for the antennas on the output of the stage with a decoupling circuit (to be explained hereafter), even if one or more (up to seven) transmitters do not deliver a voltage, and for inserting this DC supply voltage into antennas 1 and 2. Before the insertion it is checked with the help of a current measurement in a current measuring stage 28, in which operating condition the GPS antennas are, i.e. regular operation, idle run, and short circuit. The resulting information is used (to be explained hereafter) to switch on and off the power supply 34 for the HF amplifiers through window comparators 30 and an analysis stage, as well as a change-over and holding stage 32, and further to switch on and off the DC supply voltages of the GPS antennas (S1, S2).

Figure 2:
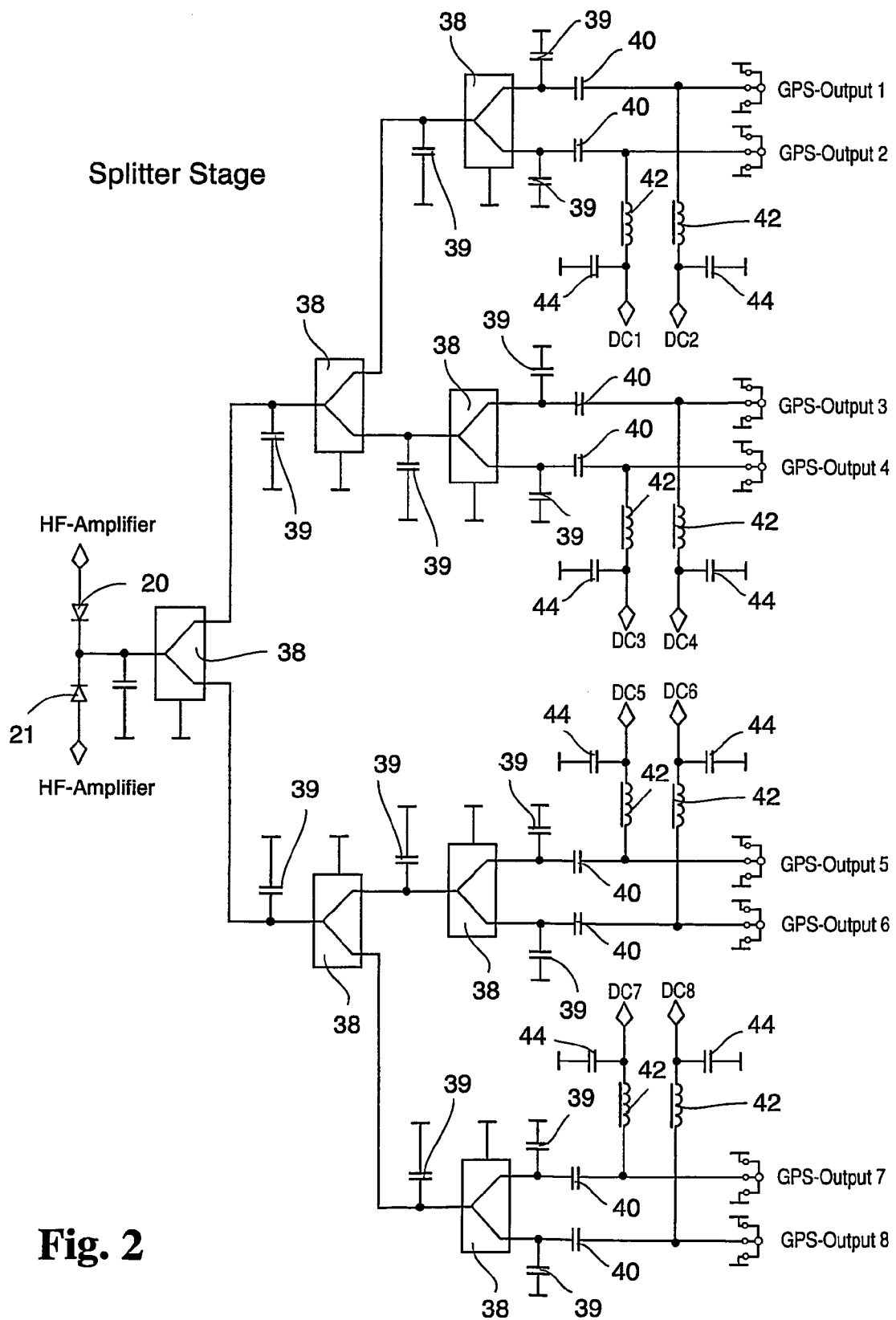
FIG. 2 is a basic circuit diagram of the splitter stage as shown in FIG. 1.
Figure 3:
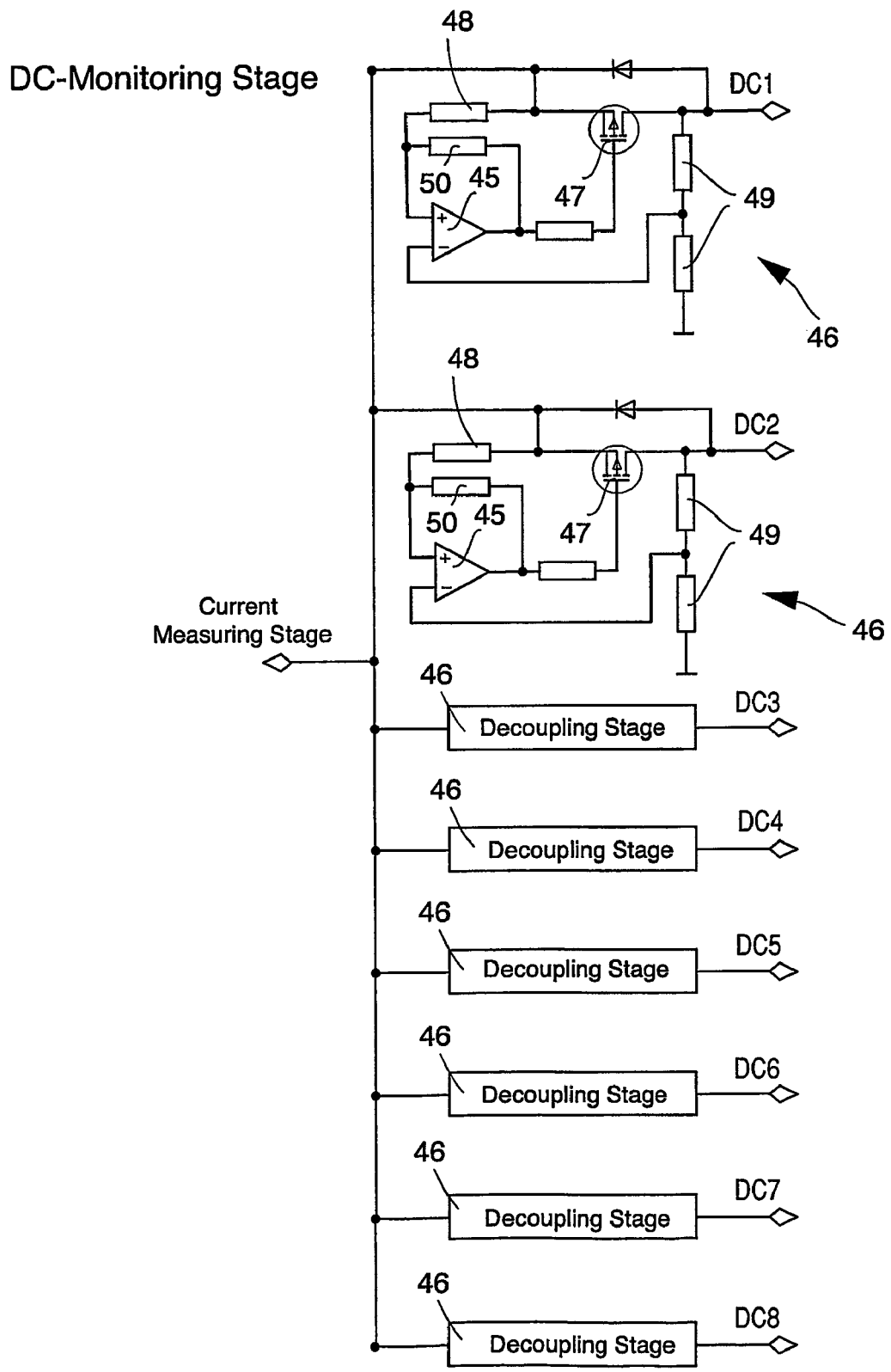
FIG. 3 is a basic circuit diagram of the DC monitoring stage as shown in FIG. 1.

In FIG. 2 the splitter stage 14 is shown which uses power distributors 38 preferably 3 dB power splitters for splitting the GPS signal supplied from the GPS antennas via the diodes 20 and 21. These power splitters are ordinary Zero degree splitters and interconnected in a tree-like structure, whereby capacitors 39 are provided for improving the matching of the outputs. To the GPS outputs 1 to 8 the GPS signal is transmitted through coupling capacitors 40. Between the coupling capacitors 40 and the GPS outputs 1 to 8 DC contacts are provided, which are connected to the DC outputs DC1 to DC8 via lowpass filters including an inductor or reactance coil 42 and capacitors 44 as a DC splitter. These DC outputs are connected to the inputs of the DC monitoring stage according to FIG. 3 and designated in the same way.

The DC monitoring stage (FIG. 3) includes 8 parallel connected decoupling stages 46, which have the task to deliver the supply voltage for the GPS antennas, even if a transmitter (up to seven) breaks down or is not used, and to completely decouple the connected transmitter stages from each other.

Moreover, the decoupling stages 46 should guarantee in the event of a falling supply voltage or a transmitter stage break-down that a switch-over to the driver stage of the transmitter, which delivers the highest voltage, takes place automatically. For this purpose a MOS-FET 47 is provided in the decoupling stage 46, which is conductive, if the criterion mentioned above is fulfilled for the respective stage. The adjustment of the MOS-FET 47 is performed through an operational amplifier (OPA) 45, which compares and amplifies the difference between the output voltage on the resistor 48, which is present on the current measuring stage 28 with the voltage supplied from the transmitter on the voltage splitter resistor 49, i.e. the voltage before and after the MOS-FET.

The operational amplifier with the largest differential voltage activates the MOS-FET 47 and makes it conductive. Thus the voltage present on the GPS output is effective on the current measuring stage through the decoupling stage 46, which detects the largest difference voltage on the operational amplifier. To avoid switching from one decoupling circuit to another with small differences in voltage a hysteresis is built-in via a feedback resistor 50.

Figure 4:
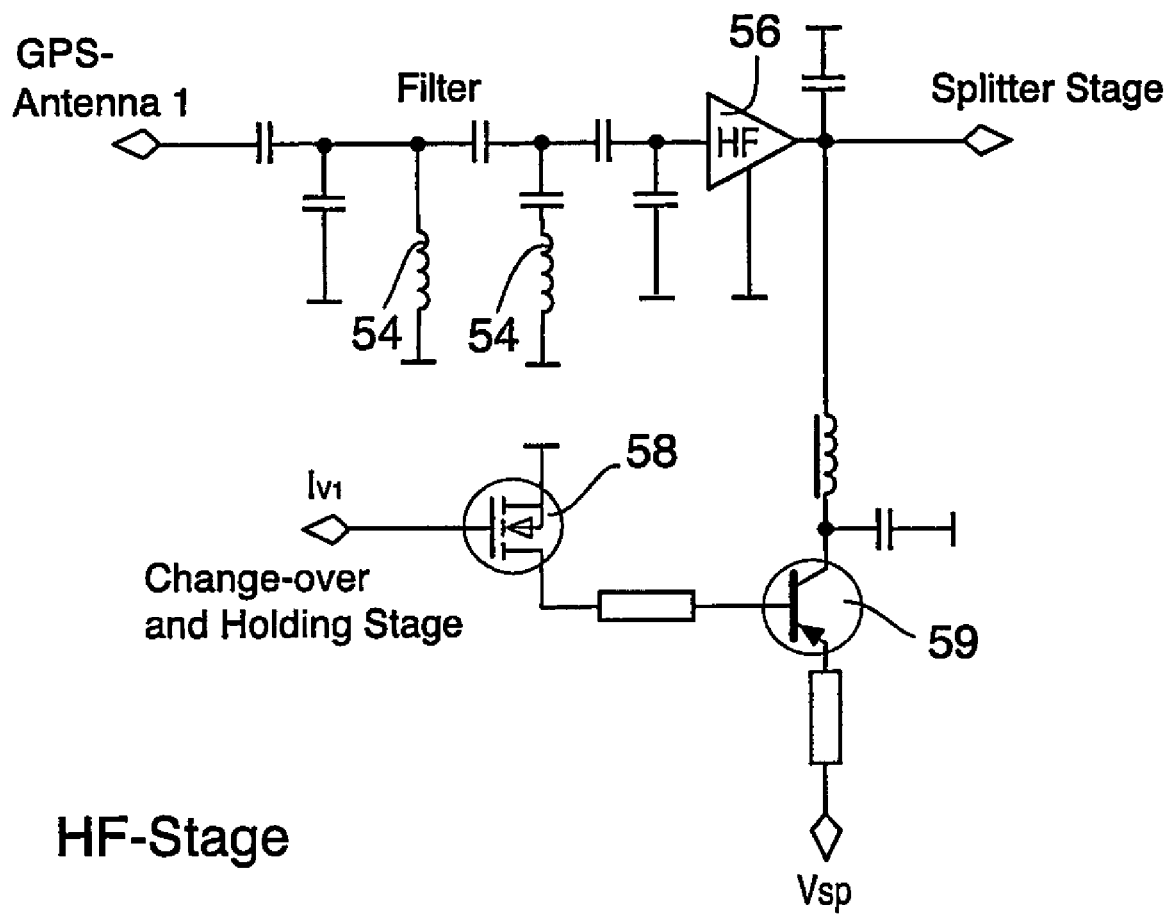
FIG. 4 is a circuit diagram of the HF amplifier as shown in FIG. 1.

In FIG. 4 filter 18 and HF amplifier 19 are shown in detail. The filter is designed as a high-pass filter of the 4th degree with LC circuit 54 already mentioned that functions as a trap at the half GPS frequency.

As an HF amplifier an integrated HF amplifier 56 is used, which is controlled by an N-channel MOS-FET 58 activated from the change-over and holding stage 32. With this control the HF amplifier 56 is switched off for saving power through a transistor 59, if no GPS signal is available from the GPS antenna, which means that the GPS antenna is out of order, not available or defective. For this purpose the HF-amplifier is designed in such a way that the supply voltage is directly applied to the output. This control of the disconnection is explained below in detail.

Figure 5:
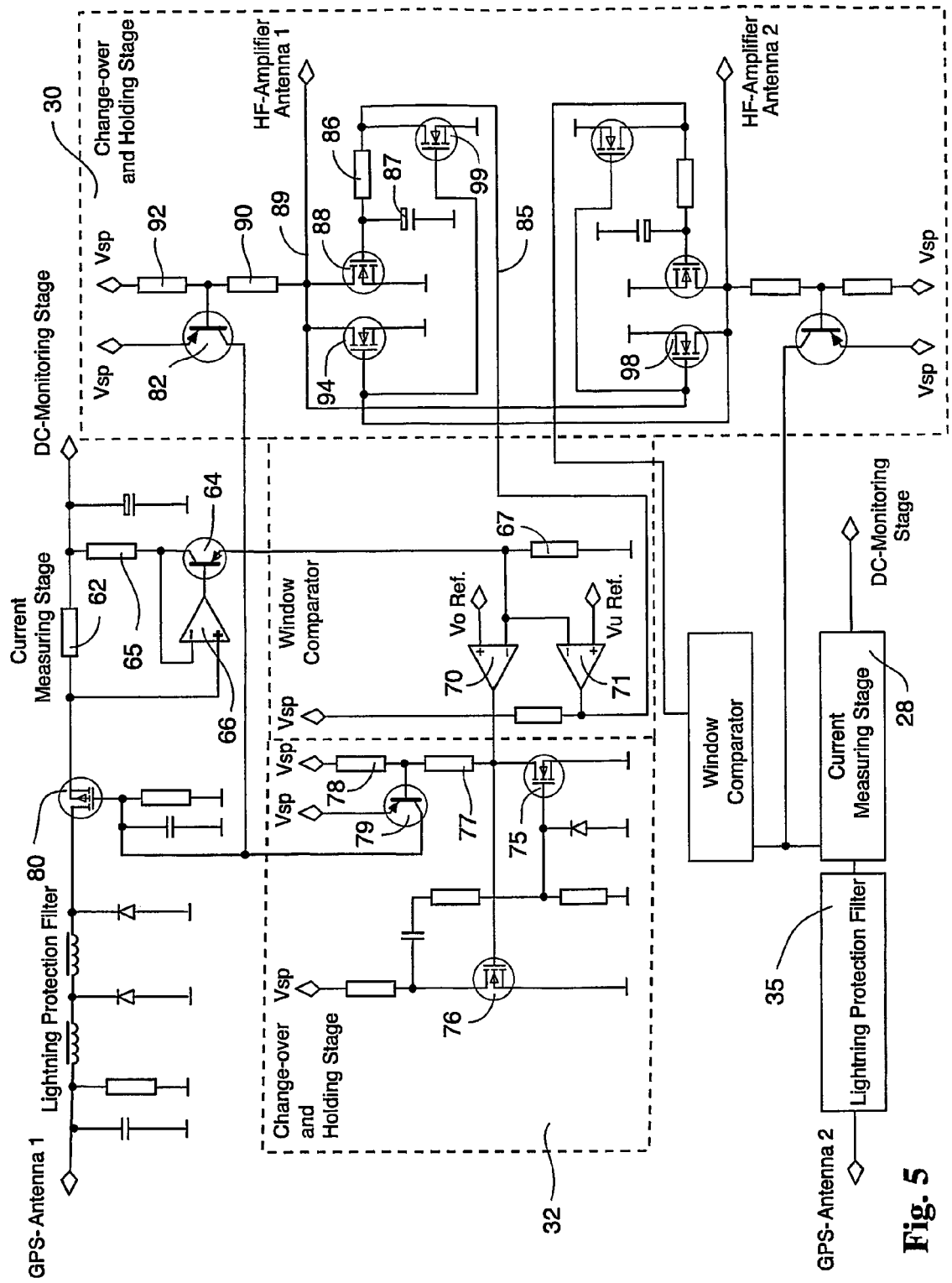
FIG. 5 is a basic circuit diagram of the DC driver stage without the DC monitoring stage.

In FIG. 5 additional circuit parts of the DC driver stage 16 and for a branch of the circuit for the GPS antenna 1 are shown in detail. The second branch shown as a block diagram is designed in the same way and works alternatively on antenna 2.

As the DC supply for the antenna must be available at any time and only a relatively low current can be delivered through the DC monitoring stage from the connected transmitters, one of both GPS antennas and the respective HF amplifier must be switched off. This function is fulfilled by the circuit illustrated in FIG. 5.

In this circuit the current measuring stage 28 contains a very low Ohm measuring resistor, and a resistor 65 in the collector circuit of a transistor 64. With the help of an operational amplifier 66 the voltage drop on the measuring resistor 62 is held equal to the voltage drop on the resistor 65. The current flowing over an accordingly designed emitter resistor 67 is proportional to the current through the measuring resistor 62 and is effective on the window comparator 30. If the emitter current is above or below a predefined limit, the window comparator 30 is activated.

This window comparator includes an operational amplifier 70 with a positive input at an upper reference voltage and an operational amplifier 71 with a positive input at the lower reference voltage. These reference voltages define the upper and lower values of the current, which is permitted to flow through the antenna. If the voltage drop falls below the lower reference value $V_{lRef}$ at idle run (no current through the antenna) on the emitter resistor 67, the output voltage of the OPA 71 increases to a high value, The same is true of a voltage drop exceeding the upper reference value $V_{uRef}$ on the emitter resistor 67, whereby the operational amplifier 70 drops to a low value on the output.

The output signal of the operational amplifier 70 is supplied through the voltage splitter 77 and 78 to the base of transistor 79 in the following analysis stage, and to the gate of the N-channel MOS-FET 76, which forms a monostable flip-flop with the MOS-FET 75, which serves the purpose of buffering the switch condition. If the upper reference value $V_{uRef}$ is exceeded (as mentioned above), the low output signal of the operational amplifier 70 results in turning off the MOS-FET 76 and turning on the MOS-FET 75. This entails immediately turning on transistor 79 because of the current flow through the voltage splitters 77 and 78. Thus the emitter voltage of transistor 79 (Vsp) is present on the gate of the P channel MOS-FET 80 in the current measuring stage 28 and turns it off, whereby the GPS antenna 1 is disconnected from the DC supply voltage (see also FIG. 1 switch S1).

If as a result of switching off or a defect of the GPS-antenna, the voltage falls below the reference value $V_{uRef}$ on the input of the window comparator, the output of the operational amplifier 71 has a high voltage value, i.e. it is effective through line 85 on an RC-element including a resistor 86 and a capacitor 87, which supply the high output signal of the operational amplifier 71 with a delay to the N-channel MOS-FET 88 and make it conductive. Thus on the base of transistor 82 a voltage becomes effective through the voltage splitter including the resistors 90 and 92, which makes transistor 82 conductive and maintains the off condition of the MOS-FET 80.

The low voltage due to the conductive MOS-FET 88 on line 89 is also supplied to the HF amplifier of the GPS antenna 1 and switches the N-channel MOS-FET 58, described with respect to FIG. 4, to the non-conductive state so that transistor 59 off. This deactivates the HF amplifier 56 by switching off the supply voltage delivered to its output (see FIG. 1, switch S3).

The voltage due to the conductive MOS-FET 88 on line 89 is also effective on an N-channel MOS-FET 98 in the second half of the two-fold symmetrically designed change-over and holding stage, which together with the N-channel MOS-FET 94 forms a bi-stable flip-flop, and turns it off. As a result, MOS-FET 94 and MOS-FET 99 are switched to the conductive state, whereby the respective switching condition is stored. By storing the switching condition it is guaranteed that only one GPS antenna and the corresponding amplifier are supplied, i.e. are in operation.

If the active GPS antenna is in normal operation, i.e. the voltage drop across the current measuring stage 28 on resistor 67, which is between the upper and lower reference values, then at the output of the operational amplifier 70 a high voltage is present and at the output of the operational amplifier 71 a low voltage is present. The high voltage at the output of the operational amplifier 70 activates the MOS-FET 76 and turns off the MOS-FET 75 and transistor 79, whereby on the gate of the P channel MOS-FET 80 a low voltage is present, which keeps it conductive i.e. keeps the GPS antenna in the operating state. The low voltage on the operational amplifier 71 is effective on the MOS-FET 88 through line 85 and the delay elements 86 and 87 and keeps it off, whereby the HF amplifier of GPS antenna 1 is supplied or in operation.

Between the GPS antenna and the MOS-FET 80 there is a lightning protection filter 35, which provides for the suppression of inductively inserted power surges to protect the circuit from damage.

As the DC driver stage is designed symmetrically, switching on and off for both branches is performed in the same way. Therefore, the lower branch in the FIG. 5 is only shown as a block-diagram.

The invention claimed is:

1. A redundant GPS antenna splitter apparatus comprising:
    a plurality of GPS antennas and respective amplifiers connected thereto;
    a plurality of passive splitters connected downstream from said amplifiers and having a plurality of GPS outputs to be connected to respective transmitters so that each GPS output has a voltage thereon corresponding to the respective transmitter; and
    a DC control stage comprising at least one current measuring stage for selectively providing a DC supply to said GPS antennas and respective amplifiers based upon the GPS outputs.

2. The redundant GPS antenna splitter apparatus according to claim 1 wherein said plurality of GPS outputs are eight in number.

3. The redundant GPS antenna splitter apparatus according to claim 1 wherein said DC control stage provides the DC supply for the first and second GPS antennas at any time, even if only one transmitter is in operation; and wherein a transmitter which supplies a highest voltage is activated.

4. The redundant GPS antenna splitter apparatus according to claim 1 wherein said DC control stage comprises a DC monitoring stage including a respective decoupling stage for each GPS output.

5. The redundant GPS antenna splitter apparatus according to claim 4 wherein each decoupling stage comprises:
    an operational amplifier responsive to a difference between a GPS output voltage for a respective transmitter and the DC supply voltage; and
    a semiconductor switch responsive to the operational amplifier to connect a transmitter with a highest GPS output voltage to provide the DC supply voltage.

6. The redundant GPS antenna splitter apparatus according to claim 5 wherein the DC supply voltage from the transmitter with the highest GPS output voltage is connected to said at least one current measuring stage.

7. The redundant GPS antenna splitter apparatus according to claim 1 wherein said DC control stage further comprises at least one window comparator and a change-over and holding stage connected thereto; and wherein one of said amplifiers is kept in switch-on mode by said at least one current measuring stage in cooperation with said at least one window comparator and said change-over and holding stage.

8. The redundant GPS antenna Splitter apparatus according to claim 7 wherein said at least one current measuring stage comprises:
   a pair of current measuring resistors connected together in series;
   an operational amplifier having an input and an output connected to said pair of current measuring resistors; and
   a transistor having a control terminal connected to the output of said operational amplifier and having a conduction terminal connected to said at least one window comparator.

9. The redundant GPS antenna splitter apparatus according to claim 8 wherein said change-over and holding stage is activated by a signal from said at least one window comparator to keep the DC supply to an active GPS antenna, and to switch off the DC supply to the other GPS antenna and the associated amplifier.

10. The redundant GPS antenna splitter apparatus according to claim 1 wherein said DC control circuit further comprises a lightning protection filter connected to each respective GPS antenna to effectively protect downstream stages from overvoltages.

11. The redundant GPS antenna splitter apparatus according to claim 1 further comprising a high-pass filter connected to each respective amplifier; and wherein each high-pass filter operates at half the GPS frequency.

12. A redundant GPS antenna splitter for a plurality of GPS antennas and respective amplifiers connected thereto, the redundant GPS splitter comprising;
   a plurality of passive splitters connected downstream from the amplifiers and having a plurality of GPS outputs to be connected to respective transmitters so that each UPS output has a voltage thereon corresponding to the respective transmitter; and
   a DC control stage comprising at least one current measuring stage for selectively providing a DC supply to the GPS antennas and respective amplifiers based upon the GPS outputs.

13. The redundant GPS antenna splitter according to claim 12 wherein said plurality of GPS outputs are eight in number.

14. The redundant GPS antenna splitter according to claim 12 wherein said DC control stage provides the DC supply for the first and second GPS antennas at any rime, even if only one transmitter is in operation and wherein a transmitter which supplies a highest voltage is activated.

15. The redundant GPS antenna splitter according to claim 12 wherein said DC control stage comprises a DC monitoring stage including a respective decoupling stage for each GPS output.

16. The redundant GPS antenna splitter according to claim 15 wherein each decoupling stage comprises:
   an operational amplifier responsive to a difference between a GPS output voltage for a respective transmitter and the DC supply voltage; and
   a semiconductor switch responsive to the operational amplifier to connect a transmitter with a highest GPS output voltage to provide the DC supply voltage.

17. The redundant GPS antenna splitter according to claim 16 wherein the DC supply voltage from the transmitter with the highest GPS output voltage is connected to said at least one current measuring stage.

18. The redundant GPS antenna splitter according to claim 12 wherein said DC control stage further comprises at least one window comparator and a change-over and holding stage connected thereto, and wherein one of the amplifiers is kept in switch-on mode by said at least one current measuring stage in Cooperation with said at least one window comparator and said change-over and holding stage.

19. The redundant GPS antenna splitter according to claim 18 wherein said at least one current measuring stage comprises:
   a pair of current measuring resistors connected together in series;
   an operational amplifier having an input and an output connected to said pair of current measuring resistors; and
   a transistor having a control terminal connected to the output of said operational amplifier and having a conduction terminal connected to said at least one window comparator.

20. The redundant GPS antenna splitter according to claim 19 wherein said change-over and holding stage is activated by a signal from said at least one window comparator to keep the DC supply to an active GPS antenna, and to switch off the DC supply to the other GPS antenna and the associated amplifier.

21. The redundant GPS antenna splitter according to claim 12 wherein said DC control circuit further comprises a lightning protection filter connected to each respective GPS antenna to effectively protect downstream stages from overvoltages.

22. The redundant GPS antenna splitter according to claim 12 further comprising a high-pass filter connected to each respective amplifier; and wherein each high-pass filter operates at half the GPS frequency.

23. A method for making a redundant GPS antenna splitter for a plurality of GPS antennas and respective amplifiers connected thereto, the redundant GPS splitter further comprising a plurality of passive splitters connected downstream from the amplifiers and having a plurality of GPS outputs to be connected to respective transmitters so that each GPS output has a voltage thereon corresponding to the respective transmitter, the method comprising:
   providing a DC control stage comprising at least one current measuring stage for selectively providing a DC supply to the GPS antennas and respective amplifiers based upon the GPS outputs.

24. The method according to claim 23 wherein the plurality of GPS outputs are eight in number.

25. The method according to claim 23 wherein the DC control stage provides the DC supply for the first and second GPS antennas at any time, even if only one transmitter is in operation; and wherein a transmitter which supplies a highest voltage is activated.

26. The method according to claim 23 wherein the DC control stage comprises a DC monitoring stage including a respective decoupling stage for each GPS output.

27. The method according to claim 26 wherein each decoupling stage comprises:
   an operational amplifier responsive to a difference between a GPS output voltage for a respective transmitter and the DC supply voltage; and
   a semiconductor switch responsive to the operational amplifier to connect a transmitter with a highest GPS output voltage to provide the DC supply voltage.

28. The method according to claim 27 wherein the DC supply voltage from the transmitter with the highest GPS output voltage is connected to the at least one current measuring stage.

29. The method according to claim 23 wherein the DC control stage further comprises at least one window comparator and a change-over and holding stage connected thereto; and wherein one of the amplifiers is kept in switch-on mode by the at least one current measuring stage in cooperation with the at least one window comparator and the changeover and holding stage.

30. The method according to claim 29 wherein the at least one current measuring stage comprises:
 a pair of current measuring resistors connected together in series;
 an operational amplifier having an input and an output connected to the pair of current measuring resistors; and
 a transistor having a control terminal connected to the output of the operational amplifier and having a conduction terminal connected to the at least one window comparator.

31. The method according to claim 30 wherein the change-over and holding stage is activated by a signal from the at least one window comparator to keep DC supply to an active GPS antenna, and to switch off the DC supply to the other GPS antenna and the associated amplifier.

* * * * *

UNITED STATES PATENT AND TRADEMARK OFFICE
CERTIFICATE OF CORRECTION

PATENT NO. : 7,171,173 B2  Page 1 of 1
APPLICATION NO. : 10/500045
DATED : January 30, 2007
INVENTOR(S) : Bernhard Zangerl It is certified that error appears in the above-identified patent and that said Letters Patent is hereby corrected as shown below:

Column 1, Line 15            Delete: "processes"
                             Insert: -- process --

Column 5, Line 53            Delete: "59 off"
                             Insert: -- 59 is off --

Column 7, Line 34, Claim 12  Delete: " UPS "
                             Insert: -- GPS --

Column 7, Line 45, Claim 14  Delete: " rime"
                             Insert: -- time --

Column 8, Line 2, Claim 18   Delete: "Cooperation"
                             Insert: -- cooperation --

Column 9, Line 4, Claim 29   Delete: "changeover"
                             Insert: -- change-over --

Signed and Sealed this

Thirty-first Day of July, 2007

JON W. DUDAS
*Director of the United States Patent and Trademark Office*